INVENTOR.
DAVID W. SCHLICHER
BY
Akel C. Benson
ATTORNEY

United States Patent Office 3,435,340
Patented Mar. 25, 1969

3,435,340
PLURAL INPUT ELECTRICAL SYSTEM FOR MEASURING ALTERNATING-CURRENT POWER
David W. Schlicher, Minneapolis, Minn., assignor to Electric Machinery Mfg. Company, Minneapolis, Minn., a corporation of Minnesota
Filed Feb. 12, 1965, Ser. No. 432,196
Int. Cl. G01r 11/32
U.S. Cl. 324—142         3 Claims

ABSTRACT OF THE DISCLOSURE

A system for measuring power in alternating-current circuits utilizing two parallel voltage circuits across the line, each containing a resistor and a rectifier and a current circuit including a current transformer in the line, said current circuit modifying the voltage in one of the voltage circuits and an output circuit connected to the voltage circuits for measuring the electric power.

---

The herein disclosed invention relates to systems for measuring alternating-current power of loads energized by a constant voltage source and has for an object to provide a simple and inexpensive system for measuring such power without the use of a conventional wattmeter.

An object of the invention resides in providing a system using a conventional ammeter for indicating the power consumption.

Another object of the invention resides in utilizing the current passing through the load for the purpose of operating the system.

A still further object of the invention resides in utilizing a control circuit having a first resistor subject to the current through the load, a second resistor of greater value, a first rectifier and a dropping resistor all connected in series across the line from the source of alternating current.

An object of the invention resides in providing the control circuit with a third resistor and a second rectifier, connected in series with the dropping resistor across the line.

A still further object of the invention resides in providing a system adapted to be used with a polyphase load and a polyphase source of electricity.

An object of the invention resides in providing a system capable of use with polyphase circuits using as many conductors as phases or with a polyphase circuit utilizing the same number of conductors as phases together with a common conductor.

Other objects of the invention reside in the novel combination and arrangement of parts and in the details of construction hereinafter illustrated and/or described.

Figure 1:
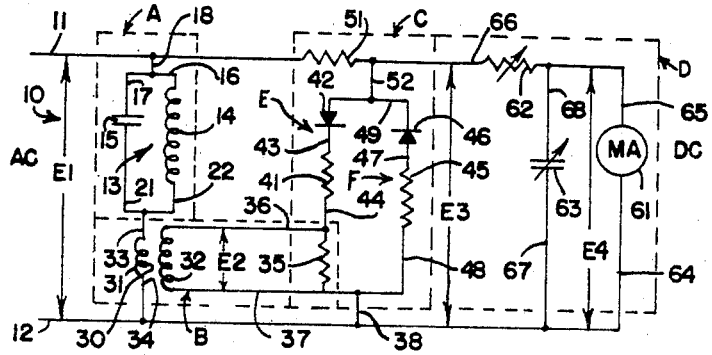
FIG. 1 is a wiring diagram of an embodiment of the invention used with single phase circuitry.

The form of the invention shown in FIG. 1 is the simplest and will be used to describe and explain the invention. The invention consists of a power circuit A and a control circuit C. Common to these two circuits is a circuit B which for the sake of convenience has been referred to as a current circuit since this circuit is actuated by the current flowing in the power circuit A and uses the current derived therefrom to actuate the control circuit C. The control circuit C comprises a first voltage circuit E and a second voltage circuit F which furnish current to an output circuit D which produces a current proportional to the power consumed by the load.

For the purpose of energizing the circuit A, a source of single phase alternating current is utilized and which is connected to a line 10 having conductors 11 and 12. The load placed across the line 10 is indicated by the reference numeral 13 and consists of an inductance 14 and a capacitor 15 which are connected in parallel. These two impedances have been shown merely for the sake of illustration and the power consumed by any type of load may be measured. The inductance 14 and capacitor 15 are connected together at one end of each thereof by means of conductors 16 and 17 which in turn are connected to the conductor 11 of line 10 by means of a conductor 18. The other ends of these impedances are connected together by means of conductors 21 and 22 which in turn are connected in the current circuit B as will be presently described.

The current circuit B includes a current transformer 30 which has a primary 31 a secondary 32. The primary 31 is connected at one end by means of a conductor 33 to the two conductors 21 and 22 of the load circuit A. The other end of this primary is connected by means of a conductor 34 to the conductor 12 of line 10. The current circuit B further includes a resistor 35 of low value, which is connected by means of conductors 36 and 37 to the ends of the secondary 32 of the current transformer 30 and by means of a conductor 38 to conductor 12 of line 10. The resistor 35 also forms part of the voltage circuit E of control circuit C.

The voltage circuit E includes a resistor 41 of relatively high value as compared to the resistor 35 and which is connected in series with resistor 35 and a rectifier 42 by means of conductors 43 and 44. The voltage circuit F includes a resistor 45 of substantially the same value as the resistor 41 and which is connected in series with a rectifier 46 similar to the rectifier 42 by means of a conductor 47. The resistor 45 is connected to a conductor 48 which in turn is connected to the conductor 38 and thus to conductor 12 of line 10. The two rectifiers 42 and 46 are connected together by means of conductor 49. It will be noted that the two rectifiers 42 and 46 are connected in opposition so that one rectifier rectifies negative pulses and the other positive pulses.

The control circuit C is energized from the line 10. For the purpose, a dropping resistor 51 is employed which is connected to the conductor 11 of line 10. This resistor is further connected by means of a conductor 52 to the conductor 49.

The output circuit D includes a microammeter 61, a filter resistor 62 and a capacitor 63. One terminal of the meter is connected by means of a conductor 64 to the conductor 12 of line 10, while the other terminal of said meter is connected by means of a conductor 65 to one end of the resistor 62. The other end of this resistor is connected by means of a conductor 66 to conductor 52 and resistor 51 and thus to the output of control circuit C. The capacitor 63 is connected by means of conductors 67 and 68 to the conductors 12 and 65, thereby shunting the meter 61. The current from the control circuit C is fed to the meter 61 and the meter may be calibrated to read directly in watts or the same may be calibrated to read in percent load.

Figure 3:
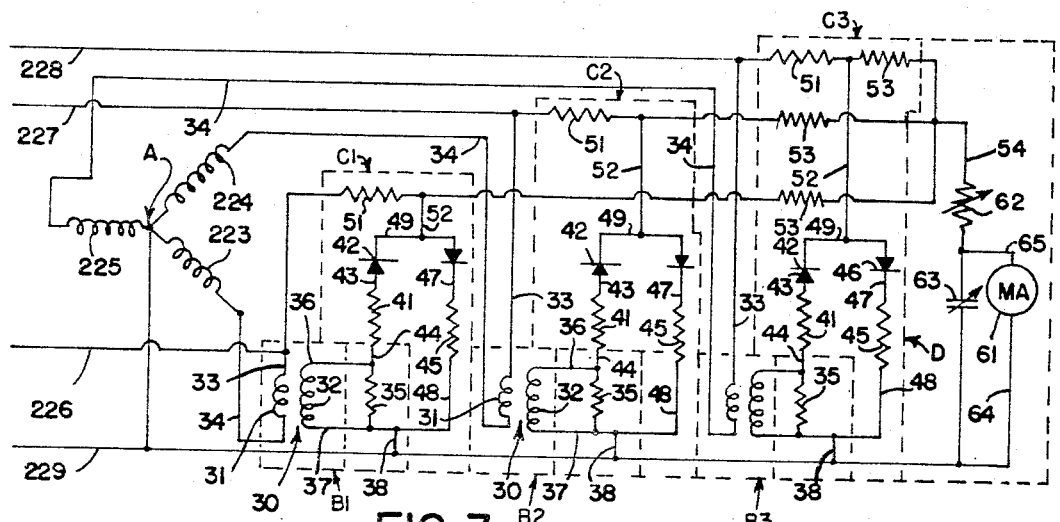
FIG. 3 is a wiring diagram illustrating the invention used with Y-type three phase circuitry.

The following values of components have been found satisfactory in a system as shown in FIG. 3 used with line voltage of 240 volts where the maximum power to be measured was 1,500 watts times current transformer ratio.

Resistors:
| | | |
|---|---|---|
| 35 | ohms | 0.33 |
| 41 | do | 1,000 |
| 45 | do | 1,000 |
| 51 | do | 33,000 |
| 53 | do | 5,000 |
| 62 | ohms adjustable | 5,000 |

Capacitor:
| | | |
|---|---|---|
| 63 | microfarads | 50 |

Meter microamp movement _____ 100

Rectifiers:
| | |
|---|---|
| 42 | Silicon diode |
| 46 | Silicon diode |

The operation of the invention is as follows: The system is only operable with accuracy where the voltage is constant. As disclosed in FIG. 1, the DC output voltage E4 is proportional to the product of voltage E2 and the cosine of the angle between E1 and E2 as indicated by the equation $E4=KE2$ cosine $\phi$. Voltage E1 is large as compared to E2 in normal applications and most of it will appear across resistor 51. The portion of it indicated as E3 is always larger than E2. Resistors 41 and 45 are of substantially equal value and many times larger than resistor 35 so that the portion of E1 appearing across resistor 41 during the positive half cycle is substantially equal to the portion appearing across resistor 45 during the negative half cycle. No signficant portion of E1 appears across resistor 35. Voltage E2 applied across resistor 35 will combine with the voltage drop across resistor 41 and will appear across conductors 66 and 12 during the positive half cycle of E1. During the negative half cycle of E1 only the drop across resistor 45 appears across these conductors. The rectifiers 42 and 46 act as valves which are opened and closed by the voltage E1 to pass through the voltage E2 only during the positive half cycle of E1. Thus, only 180° of each cycle of E2 appears at the output and which depends on the phase angle of E2 with respect to E1. With in-phase voltages, the positive half cycle of E2 would be passed through and with 180° phase displacement the negative half cycle would be passed and would appear across conductors 66 and 12. At 90° displacement, equal portions of the positive and negative half cycles would be passed for zero output. At other angles, unequal amounts of positive and negative half cycles would be passed for either a positive or negative output. The filter circuit comprising resistor 62 and condenser 63 eliminates most of the AC voltage which leaves a DC output voltage E4.

In any single phase circuit in which the voltage is held constant, the output voltage E4 can be made to represent power if E2 is proportional to the load current. This is accomplished by connecting the primary of the current transformer 30 in the load circuit and connecting the secondary output across resistor 35. E1 is the circuit voltage and cos $\phi$ is the load power factor. The output voltage E4 is measured by the DC meter 61.

In a polyphase installation it is only necessary to use one output circuit including a single meter and for a three wire three-phase circuit only two of the current and control circuits shown in FIG. 1. In a four wire three-phase circuit only one output circuit is required and three of the current and control circuits shown in FIG. 1.

Figure 2:
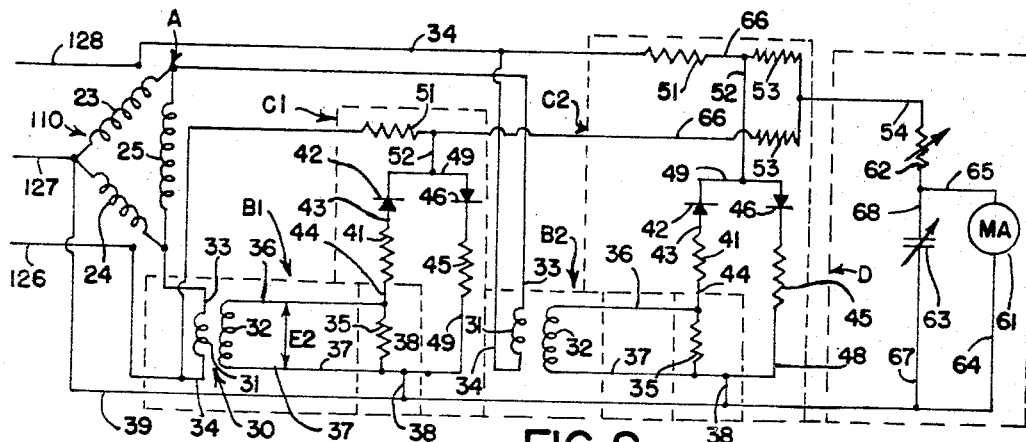
FIG. 2 is a wiring diagram illustrating the invention as used with delta type three phase circuitry.

In FIG. 2 a three wire three-phase installation is shown utilizing the instant invention. Due to the similarity of the parts the description thereof will not be repeated and the same reference numerals used to indicate corresponding parts. In this figure the load is illustrated as a motor having three windings 23, 24 and 25 connected in delta and the power line 110 as having three conductors 126, 127 and 128. The installation requires but two current circiuts B1 and B2, two control circuits C1 and C2 and a single output circuit D. The conductor 33 leading from the primary 31 of current transformer 30 of current circuit B1 is connected to the juncture between the windings 24 and 25 while the other conductor 34 is connected to the conductor 126 of line 110. In a similar manner the conductor 33 of current circuit B2 is connected to the juncture between the windings 23 and 25 while the other conductor 34 is connected to the conductor 128 of the line. Conductor 127 of the line is connected to the juncture between windings 23 and 24 and a continuation 39 thereof is connected to conductors 38 of the circuits C1 and C2 and to the conductor 64 of output circuit D. Connected to the conductor 66 of each phase is a resistor 53 which resistors are connected to a conductor 54 connected to resistor 62.

In FIG. 3 a four wire three-phase installation is shown utilizing the instant invention. Due to the similarity of the parts with respect to those shown in FIGS. 1 and 2, the description thereof will not be repeated and the same reference numerals used to indicate corresponding parts. In FIG. 3 the load is illustrated as a motor having three windings 223, 224 and 225 which are connected in Y and the line is illustrated as having three conductors 226, 227 and 228 and a common return 229. This installation requires three current circuits B1, B2 and B3, three control circuits C1, C2 and C3 and a single output circuit D. Conductors 226, 227 and 228 are connected to the resistors 51 of the three control circuits and to the conductors 33 of the three primaries 31 of the current circuits. The conductors 34 of the current circuits are connected to the windings 223, 224 and 225. The three conductors 66 of the control circuits are all connected to resistors 53 which resistors are connected to a conductor 54 connected to resistor 62, together and to the resistor 62 of the output circuit. All of the conductors 38 are connected to the common return 229.

The principal advantage of the invention lies in the low cost of the parts required. A single microammeter is utilized and takes the place of the usual wattmeter employed.

Having described the invention, what is claimed as new and desired to be protected by Letters Patent is:

1. A system for measuring alternating-current power derived from an alternating-current line having two conductors energizing alternating-current loads, comprising:
   (a) a current transformer whose primary is connected in series with the load across said line,
   (b) a dropping resistor connected at one end to one conductor of said line,
   (c) a current circuit energized by the secondary of said current transformer,
   (d) a control circuit comprising
   (e) a first voltage circuit and
   (f) a second voltage circuit
   (g) disposed in parallel with said first voltage circuit,
   (h) both of said voltage circuits being directly connected to said dropping resistor, and
   (i) both of said voltage circuits being directly connected to the other conductor of said line,
   (j) a single rectifier connected in each of said voltage circuits, and
   (k) causing flow of current in opposite directions in said voltage circuits,
   (l) a resistor in said first voltage circuit in series with the rectifier therein,
   (m) a resistor in said second voltage circuit in series with the rectifier therein and
   (n) of substantially the same resistance as the resistance of the resistor in said first voltage circuit,
   (o) a resistor in one of said voltage circuits energized by said current circuit, (p) of lesser resistance than the other resistor in said voltage circuit and (q) an output circuit energized by said control circuit.

2. A system for measuring alternating-current power from a three-phase alternating current circuit comprising a line having three conductors and energizing a three-phase delta, connected load, comprising:

(a) two current circuits,
(b) two control circuits and
(c) a single output circuit,
(d) said current circuits each being energized by
(e) a current transformer whose primary is connected to one line conductor and in series with the one section of the load connected thereto and,
(f) said current circuits being connected to the secondaries of said current transformers
(g) and each including a resistor,
(h) a dropping resistor connected to each of the conductors of the alternating-current line in which the primaries of the current transformers are connected,
(i) each of said control circuits including
(j) a first voltage circuit and
(k) a second voltage circuit,
(l) said voltage circuits of each control circuit being connected in parallel and
(m) both voltage circuits of each control circuit being connected at one end to one of said dropping resistors and
(n) all of said voltage circuits being connected at their other ends to the other conductor of the line,
(o) each of said voltage circuits including a single rectifier,
(p) said rectifiers causing flow of current in the voltage circuits of each control circuit in opposite directions,
(q) a resistor in each of said first voltage circuits in series with the rectifier therein,
(r) a resistor in each of said second voltage circuits in series with the rectifier therein,
(s) all of said above mentioned resistors having substantially the same resistance,
(t) a second resistor in each of said first voltage circuits energized by the current circuit associated with the respective control circuits,
(u) said second resistors being of lower resistance than the previously mentioned resistors in said voltage circuits
(v) an output circuit responsive to both of said control circuits.

3. A system for measuring alternating-current power from a three-phase Y-connected alternating current circuit comprising a line having four conductors, one for each phase and a neutral conductor and energizing a three-phase Y-connected load, comprising:

(a) three current circuits,
(b) three control circuits and
(c) a single output circuit,
(d) said current circuits each being energized by
(e) three current transformers, one for each line, whose primaries are connected in the line conductors in series with the various load sections,
(f) said current circuits being connected to the secondaries of said current transformers,
(g) a dropping resistor connected to each of the line conductors
(h) each of said control circuits including
(i) a first voltage circuit and
(j) a second voltage circuit,
(k) said voltage circuits for each control circuit being connected in parallel and
(l) both voltage circuits of each control circuit being connected at one end to one of said dropping resistors,
(m) all of said voltage circuits being connected at their other ends to the neutral line conductor,
(n) each of said voltage circuits including a single rectifier,
(o) said rectifiers causing flow of current in the voltage circuits of each control circuit in opposite directions,
(p) a first resistor in each of said first voltage circuits in series with the rectifier therein,
(q) a resistor in each of said second voltage circuits in series wtih the rectifier therein,
(r) all of said above mentioned resistors in said voltage circuit having substantially the same resistance,
(s) a second resistor in each of said first voltage circuits, energized by the secondary of each current circuit associated with the respective control circuits,
(t) said second resistors being of lower resistance than the previously mentioned resistors in said voltage circuits and,
(u) an output circuit operated by all of said control circuits.

References Cited

UNITED STATES PATENTS 2,829,343   4/1958   Miller _____ 324—142
3,090,006   5/1963   Lenehan _____ 324—107

RUDOLPH V. ROLINEC, *Primary Examiner.*

ALFRED E. SMITH, *Assistant Examiner.*

U.S. Cl. X.R.

235—194; 324—107; 328—160